United States Patent [19]

Rodrigues

[11] 4,433,664
[45] Feb. 28, 1984

[54] FUEL SYSTEM FOR AN INTERNAL COMBUSTION ENGINE

[76] Inventor: John J. Rodrigues, 23 Hall Dr., Orinda, Calif. 94563

[21] Appl. No.: 169,728

[22] Filed: Jul. 17, 1980

[51] Int. Cl.³ .......................................... F02B 43/00
[52] U.S. Cl. ................................. 123/527; 123/525; 123/527; 123/575; 48/180 R; 48/180 C
[58] Field of Search .............. 123/527, 525, 529, 575; 261/16; 48/180 R, 180 C

[56] References Cited

U.S. PATENT DOCUMENTS

| | | | |
|---|---|---|---|
| 2,831,756 | 4/1958 | Miles et al. | 123/526 |
| 2,896,599 | 7/1959 | Ensign | 123/527 |
| 2,902,988 | 9/1959 | Rippingille | 123/529 |
| 3,565,201 | 2/1971 | Petsinger | 123/527 |
| 3,789,820 | 2/1974 | Douglas et al. | 123/526 |
| 4,043,306 | 8/1977 | Abbott | 123/527 |
| 4,068,639 | 1/1978 | Cook | 123/525 |
| 4,338,905 | 7/1982 | Urich | 123/525 |

OTHER PUBLICATIONS

M. Schultz, "My 30,000 Miles on Propane", Popular Mechanics, Apr. 1980, pp. 108–109 (201).
M. Schultz, "Converting Your Car to Propane", Popular Mechanics, Sep. 1979, pp. 48A–48D.
Popular Mechanics–"Dual Fuel Energy Option", p. 16, Aug. 1979.

*Primary Examiner*—Charles J. Myhre
*Assistant Examiner*—E. Rollins Cross
*Attorney, Agent, or Firm*—Edward Brosler; Merwyn G. Brosler

[57] ABSTRACT

A fuel system of the gaseous type utilizing the gas such as propane, methane or the like, wherein gas, preferably in liquefied form, in a tank carried in the trunk compartment of a car, for example, is taken from the tank in gaseous form and conveyed to the intake manifold of the internal combustion engine of the car at very low pressure, through a feeder gasket installed between the carburetor and the intake manifold. Thus it does not require modification of the existing carburetor or replacement thereof, and when installed for alternate use with an existing conventional type gasoline fuel system, means are employed for selectively switching from one system to the other.

7 Claims, 4 Drawing Figures

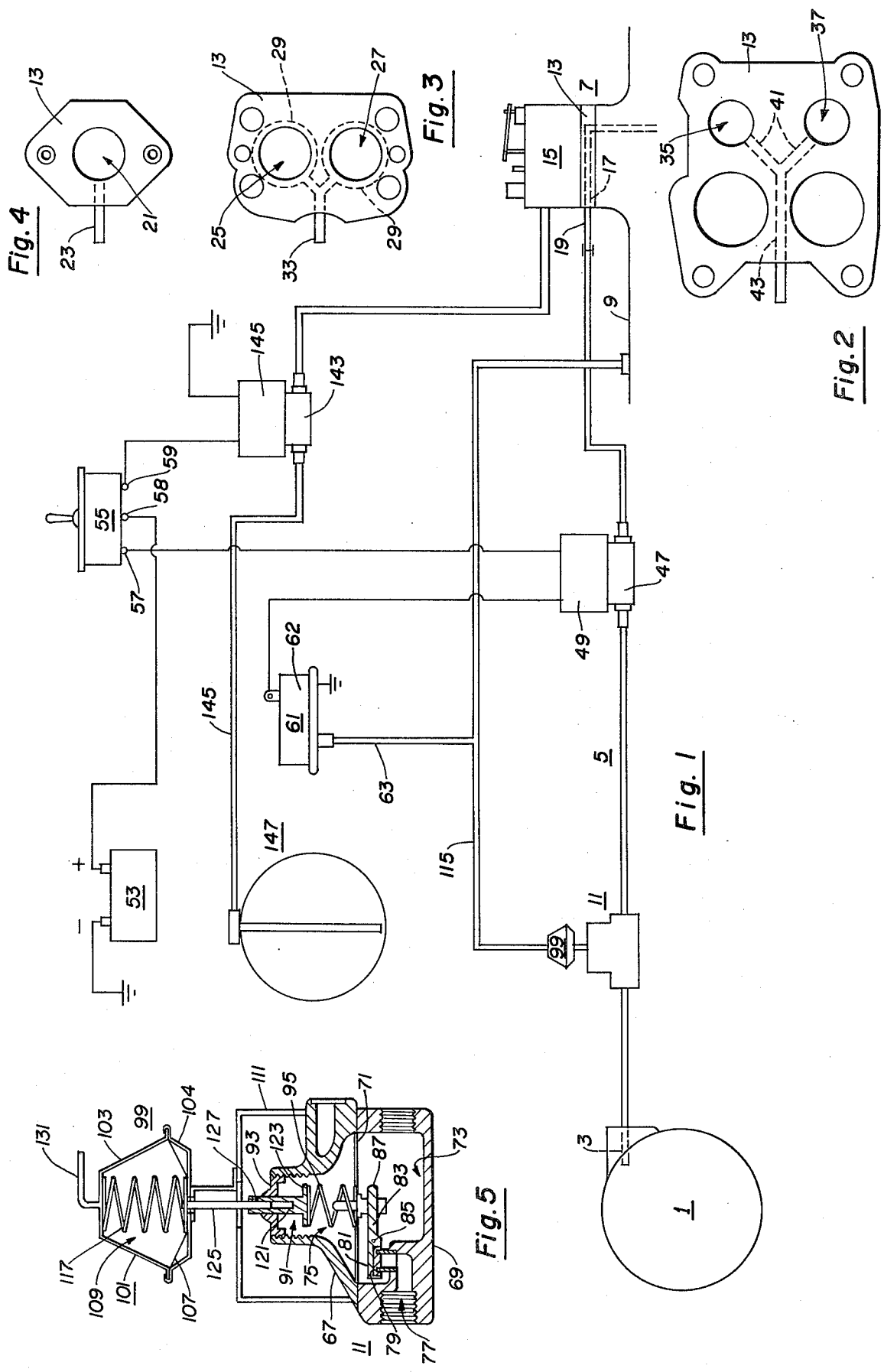

FUEL SYSTEM FOR AN INTERNAL COMBUSTION ENGINE

THE INVENTION

The invention relates to fuel systems, primarily for use with internal combustion engines, and more particularly, to a fuel system utilizing gaseous fuel and one which can be economically combined with a conventional gasoline supply system.

Among the objects of my invention are:
1. To provide a novel and improved fuel system utilizing gaseous fuel;
2. To provide a novel and improved gaseous fuel system adapted for use with a conventional gasoline internal combustion engine;
3. To provide a novel and improved gaseous fuel system adapted for combination with a gasoline fuel system for alternate use in supplying fuel to an internal combustion engine;
4. To provide a novel and improved combination of a gaseous fuel system and a gasoline fuel system which may be economically produced and which can be selectively utilized.

Additional objects of my invention will be brought out in the following description of a preferred embodiment of the same, taken in conjunction with the accompanying drawings wherein:

FIG. 1 is a diagrammatic view depicting the gaseous fuel system of the present invention and illustrating how the same may be combined for alternate use, with a conventional gasoline supply system for an internal combustion engine;

FIG. 2 is a plan view of a coupling in the form of a feeder gasket for feeding gaseous fuel to an internal combustion engine having a four barrel carburetor;

FIG. 3 is a view corresponding to that of FIG. 2 but depicting a feeder gasket for an internal combustion engine having a two barrel carburetor.

FIG. 4 is a view corresponding to that of FIG. 2 but depicting a feeder gasket for an internal combustion engine having a single barrel carburetor.

FIG. 5 is a view in section through a modified pressure regulator constituting an important unit in the system of FIG. 1.

Referring to the drawings for details of my invention in its preferred form, a tank 1 is disclosed, for holding gas under pressure, the tank having a discharge fitting 3 to which is connected a discharge line 5 terminating in means 7 for coupling the discharge line to the intake manifold 9 of an internal combustion engine.

Important to the invention is the fact that the discharge fitting 3 on the tank is always exposed inwardly of the tank to gaseous atmosphere within the tank. Accordingly, should the contents of the tank be in liquedfied form the discharged fitting should terminate within the tank at a point above the liquid level of such liquedfied gas.

Such gas, which would normally be under high pressure, which may be of the order of 250 lbs. psi, is promptly reduced in pressure to a low value, ranging from approximately 0.3 psi to approximately 1.3 psi, for an internal combustion engine which may have a displacement as large as 472 cubic inches. Such drop in oressure may be realized through the introduction of a pressure regulator 11 in the discharge line, at a location adjacent the fuel tank, whereby the fuel line from the tank which, in all likelihood, would be located in the trunk compartment of an automotive vehicle, to the engine under the hood, will be at the low pressure, thereby greatly enhancing the safety of the system.

The means 7 which couples the gas discharge line to the intake manifold, constitutes a feeder gasket 13 for installation between a conventional carburetor 15 and the intake manifold of the internal combustion engine, the gasket having openings adapted to register with normally aligned openings between the carburetor and the intake manifold, with the discharge line extending edgewise through said gasket to one or more of such openings therein, to establish direct flow communication with the intake manifold.

Preferably, the terminal end of the discharge line is in the form of a tube 17 within the gasket, with a portion 19 extending edgewise from the gasket for connection to the balance of the discharge line.

If the carburetor be of the single barrel type, the gasket 13, as depicted in FIG. 4, will have but a single opening 21, with the terminal end of the discharge line in the form of a short tube 23 extending edgewise into the gasket and terminating with its inward end exposed to the opening.

If the carburetor be of the dual type barrel type, the feeder gasket 13 will have two fuel openings 25 and 27 to the intake manifold, with each opening surrounded by a circumferential tube 29, these circular tubes being flow connected to a short straight tube 33 extending edgewise outwardly of the gasket. Slits in the inner circumference of each circular tube will permit gas to flow from the discharge line into the intake manifold.

Where the carburetor is of the four barrel type, the feeder gasket 13 will also have two openings 35, 37 for normal feeding of fuel into the intake manifold, while the terminal end of the discharge line embedded in this gasket, may take the form of a Y where each branch 41 of the Y terminates at one of the two aforementioned openings, while the main stem 43 extends edgewise outwardly of the gasket for connection to the main portion of the discharge line.

In each of the aforementioned cases, the fuel gas will enter the intake manifold with the discharge end of the discharge line in close proximity to the intake manifold, whereby not only to minimize and essentially eliminate all prospects of flashback, but to discharge the gas directly into the heated region within the intake manifold. This can be achieved with added beneficial effect by extending the ends of the tubing down through the associated openings in the gasket and into the intake manifold.

Connected in the discharge line 5 is a normally closed valve assembly 47 controllable to an open condition by an associated solenoid 49 electrically connected across the storage battery 53 of the car via a manually operable single pole preferable double throw switch 55 having three terminals 57, 58 and 59, only two of which are connected in this circuit, namely the central terminal 58 connected to the positive terminal of the battery, and terminal 57 connected via the solenoid to ground.

To assure, however, that gaseous fuel will now flow to the intake manifold in the absence of a condition of vacuum being developed therein, a vacuum switch 61 is added to the electrical circuit of the solenoid 49, such vacuum switch including a normally open switch is adapted to be closed in response to development of a condition of vacuum within the switch housing 62. A tubular connection 63 from the vacuum switch housing to the intake manifold will assure that the vacuum created in the vacuum switch housing will be representative of the vacuum condition within the intake manifold, whereby gaseous fuel from the tank will be blocked from the flowing into the intake manifold, unless the engine is turning over and creating a vacuum condition in the intake manifold.

Another and important feature of the invention resides in adjusting the output pressure of the pressure regulator 11 in accordance with the demands of the engine for fuel, to satisfy the requirements of the driver, who, by altering pressure on the foot pedal, correspondingly controls intake of air only, through the carburetor, which, in turn, correspondingly alters the vacuum condition within the intake manifold.

Such alterations of the vacuum condition in the intake manifold are utilized to correspondingly alter the response setting of the pressure regulator, so that, in accordance with the desires of the driver, the output of the pressure regulator may be increased or decreased.

The pressure regulator may, in part, be of the conventional type, and may comprise a housing of two sections 67, 69, clamping a diaphragm 71 between them to create a chamber 73 below and a chamber 75 above. An intake passageway 77 into the lower chamber, terminates in a circular ridge 79 engageable by a closure 81 at one end of a lever 83 fulcrummed at an intermediate point 85. The opposite end 87 of the lever is coupled to the center of the diagram 71, whereby movements of the diaphragm will lift the closure to the varying degrees in accordance with the degree of downward movement of the diaphragm, and, likewise, will move the closure toward closing position in accordance with the upward movements of the diaphragm 71. The diaphragm will thus fluctuate in accordance with variations in pressure, of the incoming gaseous fuel, and such fluctuations will cause a decided drop in pressure and, at the same time, tend to stabilize such lowered pressure.

The upper chamber of the pressure regulator has a threaded opening 91 for adjustably receiving an internal nut 93, and between the diaphragm and this adjustable nut, is a compression spring 95 which would normally bear against the nut. Normally, this nut would enable adjustment of the output pressure by altering the spring pressure on the diaphragm 71.

To enable the pressure regulator 11 to alter such low output pressure in accordance with the demands of the engine as determined by the driver, the pressure regulator described, is modified by introducing a vacuum control 99 which is made responsive to the vacuum condition in the intake manifold at all times, to alter the effective adjustment of the pressure regulator, to cause the low output pressure to fluctuate accordingly. Thus the fuel delivered to the intake manifold will be responsive to the prevailing vacuum condition in the intake manifold as determined by the driver, the conventional portion of the pressure regulator functioning as an adjustable valve assembly responsive to the changing degrees of vacuum in the engine.

Such vacuum control includes a housing 101 made up of two component parts 103, 104 between which is a stretchable diaphragm 107 to provide a vacuum chamber 109. The housing is supported slightly above the conventional portion of the pressure regulator by a framework 111 carried by the housing section 67. The upper end of the vacuum chamber is connected by a tube 115, preferably, to the tubular connection 63 leading from the vacuum switch to the intake manifold, thus placing the vacuum chamber in flow connection with the intake manifold.

Within the vacuum chamber is a compression spring 117, which, in the absence of vacuum in the vacuum chamber, will be of sufficient calibration to depress the stretchable diaphragm into engagement with the bottom of the housing.

The normally adjustable nut 93 of the conventional pressure regulator is provided with a central passageway to slidably receive a connector element 121 having a disc shaped head 123 to not only preclude its withdrawal through the adjusting nut, but it now functions as the abutment for the spring 95, and the nut may be withdrawn to its outermost position as illustrated, which, for conventional pressure regulator, would correspond to its idling adjustment.

This connector element is drilled at its other end to receive one end of a stem 125 extending downwardly from the center of the stretchable diaphragm, and such stem is secured to the connector element 121 by a set screw 127, thus making the overall length adjustable to suit conditions.

The vacuum chamber housing at its upper end is provided with a tube fitting 131 for connection to the tube 115 which leads to a source of vacuum, and more particularly, the intake manifold of the engine, whereby the stretchable diaphragm will be exposed to and become responsive to, vacuum changes in the intake manifold.

Normally, the spring in the vacuum chamber will be sufficiently strong to compress the spring 95 in the pressure regulator to an intermediate condition of compression, as depicted in the drawings, thereby placing the pressure regulator diaphram under partial stress. Such stress will be partially relieved by the subsequent effects of the vacuum condition in the intake manifold, and will vary with the degree of such vacuum.

Thus, the pressure regulator, as modified by the added vacuum chamber, will function to alter the pressure output of the gas, in accordance with changing vacuum conditions in the intake manifold, and will thus alter the flow of gas to the intake manifold in accordance therewith.

The system as thus far described is capable of functioning on its own, to supply gaseous fuel to the intake manifold of an internal combustion engine, as the one end only fuel supplied for such engine.

However, the aforementioned system, because of its simplicity, may be readily installed in an automotive vehicle as an alternative or changeover system with respect to the conventional gasoline supply system normally present in the majority of conventional automobiles.

To effect such combination, a valve assembly 143 is installed in the gasoline fuel line 145 which leads from the gasoline tank 147 to the carburetor 15.

This valve assembly, like the valve assembly 47, is normally closed, and under control of a solenoid 145, which is connected in circuit across the storage battery 53 via the terminals 58 and 59 of the switch 55.

Thus, when it is desired to switch from one system to the other, this is accomplished simply by throwing the switch from one closed position to the other, and when the ignition is turned off to shut down the engine, throwing the switch to its neutral position will serve to block flow of fuel from either system to the engine.

The switch 55 if installed in some out-of-the-way location, such as under the dashboard, it will be a deterrent to car theft, for not only is its function, not apparent, but, if underneath the dashboard, it is not apt to be noticed, and when in its neutral position, the car cannot be started.

It is of considerable significance to note that when the gaseous supply system is installed for use as an alternate to an existing gasoline supply system, the installation of the feeder gasket considerably simplifies such combination, in that no change or attachment to the existing carburetor is necessary, thus greatly simplifying the installation of such gaseous fuel supply system as an alternate to an existing gasoline supply system, therefore rendering such an installation very economical.

From the foregoing description of my invention in its preferred form and in considerable detail, it should be apparent that the same is subject to alteration and modification without departing from the underlying principles involved, and I, accordingly, do not desire to be limited in my protection to the specific details illustrated and described, except as may be necessitated by the appended claims.

I claim:

1. A gaseous fuel system for an internal combustion engine comprising a tank for holding gas in liquified form under substantial normally high pressures deemed risky under the hood of an internal combustion engine, a discharge fitting on said tank exposed at all times, inwardly of said tank, to gaseous atmosphere within said tank, when said tank has such liquified gaseous fuel content to assure gaseous discharge at all times despite said pressurized liquified content, a discharge line from said discharge fitting and terminating in means for flow coupling said line to an intake manifold of such internal combustion engine, and a pressure regulator connected in said line in proximity to said tank for reducing such normally high tank pressures to materially lower values deemed safe when supplied at such low values to such internal combustion engine.

2. A gaseous fuel system in accordance with claim 1, characterized by means for supplying air to such intake manifold to mix with said gaseous fuel in said intake manifold, said means for flow coupling said discharge line to an intake manifold of such internal combustion engine, being installable at the connection of said air supply means to such intake manifold.

3. A gaseous fuel system in accordance with claim 2, characterized by said means for flow coupling said line to an intake manifold at the connection of said air supply means to such intake manifold, including a gasket for installation between such air supply means and such intake manifold, said gasket having an opening adapted to register with normally aligned openings between such air supply means and such intake manifold, said discharge line extending through said gasket to said opening to establish flow communication with such intake manifold when installed, whereby do not only minimize and essentially eliminate all prospects of flashback, but to discharge the gas directly into the heated region within the intake manifold.

4. A gaseous fuel system in accordance with claim 1, characterized by a normally closed solenoid controlled valve in said discharge line, an electrical circuit including the solenoid of said solenoid controlled valve and a normally open vacuum switch adapted for actuation to a closed condition in response to creation of a vacuum condition in said vacuum switch.

5. A gaseous fuel system in accordance with claim 4, characterized by means for continually exposing said vacuum switch to conditions within the intake manifold of such internal combustion engine, whereby during starting of such engine, said vacuum switch will close and energize said solenoid to open its associated valve and permit flow of gas in said discharge line, and upon shutting down of such engine, said vacuum switch will open and de-energize said solenoid and cause closing of its associated valve to automatically preclude loss of gas through said discharge line during non-operating condition of such engine.

6. A gaseous fuel system adapted for an internal combustion engine having an intake manifold comprising a tank for holding liquified gas under substantial pressure and capable of being installed in the trunk of a car propelled by such engine, a discharge fitting on said tank exposed at all times, inwardly of said tank, to gaseous atmosphere within said tank, when said tank has liquified fuel content and is installed in the trunk of such car, a discharge line, from said discharge fitting and of a length adapted to reach the intake manifold of such engine when said tank is installed in such trunk, said line terminating in means for flow coupling said line to such intake manifold, a pressure regulator in said line is proximity to said tank and adapted to drop tank pressure of said gaseous fuel at the input side of said regulator to a very low safe value at the discharge side of said regulator, and means responsive to changing vacuum conditions in such intake manifold during operation of such engine, for altering the pressure drop across said regulator to alter the flow of gaseous fuel to such intake manifold within a safe low pressure range whereby gaseous fuel will at all times be at such low safe pressure values from said pressure regulator when thus installed in proximity to said tank.

7. A gaseous fuel system in accordance with claim 6, characterized by said safe flow pressure range covering pressures from values of the order of approximately 0.3 psi to the order of approximately 1.3 psi.

* * * * *